(12) United States Patent
Court

(10) Patent No.: US 10,726,611 B1
(45) Date of Patent: Jul. 28, 2020

(54) DYNAMIC TEXTURE MAPPING USING MEGATEXTURES

(71) Applicant: Electronic Arts Inc., Redwood City, CA (US)

(72) Inventor: Craig Alexander Court, Godalming (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 11 days.

(21) Appl. No.: 15/246,358

(22) Filed: Aug. 24, 2016

(51) Int. Cl.
*G06T 15/50* (2011.01)
*G06T 15/04* (2011.01)
*A63F 13/20* (2014.01)
*A63F 13/60* (2014.01)

(52) U.S. Cl.
CPC ............ *G06T 15/503* (2013.01); *A63F 13/20* (2014.09); *A63F 13/60* (2014.09); *G06T 15/04* (2013.01)

(58) Field of Classification Search
CPC ....... G06T 11/00; G06T 11/001; G06T 15/04; G06T 15/503; G06T 2210/36; A63F 13/20; A63F 13/60
USPC .......................................................... 345/582
See application file for complete search history.

(56) References Cited

U.S. PATENT DOCUMENTS

| | | |
|---|---|---|
| 5,274,801 A | 12/1993 | Gordon |
| 5,548,798 A | 8/1996 | King |
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Andersson, S., Goransson, J.: Virtual Texturing with WebGL. Master's thesis, Chalmers University of Technology, Gothenburg, Sweden (2012).*

(Continued)

*Primary Examiner* — Sae Won Yoon
(74) *Attorney, Agent, or Firm* — Knobbe, Martens, Olson & Bear, LLP

(57) ABSTRACT

Embodiments of systems and methods described herein disclose the use of megatextures to specify blend maps for different instances of an object within a game environment. Each blend map may specify a blending between two or more different versions of the object. In some embodiments, the two or more different versions may correspond to different visual appearances associated with the object (for example, an undamaged object and a damaged object). The blend map for an instance of the object may be dynamically updated based on one or more actions within the game environment, allowing for the visual appearance of the object instance to change within the game environment in response to various actions.

17 Claims, 11 Drawing Sheets

(56) References Cited

U.S. PATENT DOCUMENTS

| | | | |
|---|---|---|---|
| 7,415,152 B2 | 8/2008 | Jiang et al. | |
| 8,100,770 B2 | 1/2012 | Yamazaki et al. | |
| 8,142,282 B2 | 3/2012 | Canessa et al. | |
| 8,154,544 B1 | 4/2012 | Cameron et al. | |
| 8,207,971 B1 | 6/2012 | Koperwas et al. | |
| 8,267,764 B1 | 9/2012 | Aoki et al. | |
| 8,281,281 B1 * | 10/2012 | Smyrl | G06T 13/00 |
| | | | 345/428 |
| 8,395,626 B2 | 3/2013 | Millman | |
| 8,398,476 B1 | 3/2013 | Sidhu et al. | |
| 8,540,560 B2 | 9/2013 | Crowley et al. | |
| 8,599,206 B2 | 12/2013 | Hodgins et al. | |
| 8,624,904 B1 | 1/2014 | Koperwas et al. | |
| 8,860,732 B2 | 10/2014 | Popovic et al. | |
| 8,914,251 B2 | 12/2014 | Ohta | |
| 9,117,134 B1 * | 8/2015 | Geiss | G06T 5/009 |
| 9,256,973 B2 | 2/2016 | Koperwas et al. | |
| 9,317,954 B2 | 4/2016 | Li et al. | |
| 9,483,860 B2 | 11/2016 | Hwang et al. | |
| 9,616,329 B2 | 4/2017 | Szufnara et al. | |
| 9,741,146 B1 | 8/2017 | Nishimura | |
| 9,811,716 B2 | 11/2017 | Kim et al. | |
| 9,826,898 B1 | 11/2017 | Jin et al. | |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 10,118,097 B2 | 11/2018 | Stevens | |
| 10,198,845 B1 | 2/2019 | Bhat et al. | |
| 10,388,053 B1 | 8/2019 | Carter, Jr. et al. | |
| 10,403,018 B1 | 9/2019 | Worsham | |
| 10,535,174 B1 | 1/2020 | Rigiroli et al. | |
| 2002/0180739 A1 | 12/2002 | Reynolds et al. | |
| 2004/0227760 A1 | 11/2004 | Anderson et al. | |
| 2004/0227761 A1 | 11/2004 | Anderson et al. | |
| 2005/0237550 A1 | 10/2005 | Hu | |
| 2006/0036514 A1 | 2/2006 | Steelberg et al. | |
| 2006/0149516 A1 | 7/2006 | Bond et al. | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1 | 2/2008 | Elmieh et al. | |
| 2008/0152218 A1 | 6/2008 | Okada | |
| 2008/0268961 A1 | 10/2008 | Brook | |
| 2008/0316202 A1 | 12/2008 | Zhou et al. | |
| 2009/0066700 A1 | 3/2009 | Harding et al. | |
| 2009/0315839 A1 | 12/2009 | Wilson et al. | |
| 2010/0134501 A1 | 6/2010 | Lowe et al. | |
| 2010/0251185 A1 * | 9/2010 | Pattenden | A63F 13/10 |
| | | | 715/849 |
| 2011/0012903 A1 | 1/2011 | Girard | |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0269540 A1 | 11/2011 | Gillo et al. | |
| 2011/0292055 A1 | 12/2011 | Hodgins et al. | |
| 2012/0083330 A1 | 4/2012 | Ocko | |
| 2012/0115580 A1 | 5/2012 | Hornik et al. | |
| 2012/0220376 A1 | 8/2012 | Takayama et al. | |
| 2012/0244941 A1 | 9/2012 | Ostergren et al. | |
| 2012/0303343 A1 | 11/2012 | Sugiyama et al. | |
| 2012/0313931 A1 | 12/2012 | Matsuike et al. | |
| 2013/0063555 A1 * | 3/2013 | Matsumoto | H04N 5/23238 |
| | | | 348/38 |
| 2013/0120439 A1 | 5/2013 | Harris et al. | |
| 2013/0121618 A1 * | 5/2013 | Yadav | G06T 5/008 |
| | | | 382/294 |
| 2013/0222433 A1 | 8/2013 | Chapman et al. | |
| 2013/0235045 A1 | 9/2013 | Corazza et al. | |
| 2013/0263027 A1 * | 10/2013 | Petschnigg | G06F 3/048 |
| | | | 715/761 |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2015/0113370 A1 | 4/2015 | Flider | |
| 2015/0126277 A1 | 5/2015 | Aoyagi | |
| 2015/0187113 A1 | 7/2015 | Rubin et al. | |
| 2015/0235351 A1 * | 8/2015 | Mirbach | G06T 5/002 |
| | | | 382/154 |
| 2015/0243326 A1 | 8/2015 | Pacurariu et al. | |
| 2015/0381925 A1 | 12/2015 | Varanasi et al. | |
| 2016/0026926 A1 | 1/2016 | Yeung et al. | |
| 2016/0071470 A1 | 3/2016 | Kim et al. | |
| 2016/0217723 A1 | 7/2016 | Kim et al. | |
| 2016/0307369 A1 * | 10/2016 | Freedman | G06T 19/00 |
| 2016/0314617 A1 | 10/2016 | Forster et al. | |
| 2016/0354693 A1 | 12/2016 | Yan et al. | |
| 2017/0301310 A1 | 10/2017 | Bonnier et al. | |
| 2017/0301316 A1 | 10/2017 | Farell | |
| 2018/0043257 A1 | 2/2018 | Stevens | |
| 2018/0122125 A1 | 5/2018 | Brewster | |
| 2018/0211102 A1 | 7/2018 | Alsmadi | |
| 2019/0139264 A1 | 5/2019 | Andreev | |

FOREIGN PATENT DOCUMENTS

| | | |
|---|---|---|
| CN | 105405380 A | 3/2016 |
| CN | 105825778 A | 8/2016 |

OTHER PUBLICATIONS

Klein, Joseph. Rendering Textures Up Close in a 3D Environment Using Adaptive Micro-Texturing. Diss. Mills College, 2012.*

Fikkan, Eirik. Incremental loading of terrain textures. MS thesis. Institutt for datateknikk og informasjonsvitenskap, 2013.*

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Han et al., "On-line Real-time Physics-based Predictive Motion Control with Balance Recovery," Eurographics, vol. 33(2), 2014, 10 pages.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs.

(56) References Cited

OTHER PUBLICATIONS

Levine, S. et al., "Continuous Character Control with Low-Dimensional Embeddings", Stanford University, University of Washington, 10 pgs.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-09/10/0012, 2 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Treuille, A. et al., "Near-optimal Character Animation with Continuous Control", University of Washington, 2007, 7 pgs.
Vaillant et al., "Implicit Skinning: Real-Time Skin Deformation with Contact Modeling", (2013) ACM Transactions on Graphics, vol. 32 (n °4). pp. 1-11. ISSN 0730-0301, 12 pgs.
Wu et al., "Goal-Directed Stepping with Momentum Control," Eurographics/ ACM SIGGRAPH Symposium on Computer Animation, 2010, 6 pages.
Anagnostopoulos et al., "Intelligent modification for the daltonization process", International Conference on Computer Vision Published in 2007 by Applied Computer Science Group of digitized paintings.
Avenali, Adam, "Color Vision Deficiency and Video Games", The Savannah College of Art and Design, Mar. 2013.
Badlani et al., "A Novel Technique for Modification of Images for Deuteranopic Viewers", May 2016.
Dudash, Bryan. "Skinned instancing." NVidia white paper(2007).
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Hernandez, Benjamin, et al. "Simulating and visualizing real-time crowds on GPU clusters." Computación y Sistemas 18.4 (2014): 651-664.
McDonnell, Rachel, et al. "Clone attack! perception of crowd variety." ACM Transactions on Graphics (TOG). vol. 27. No. 3. ACM, 2008.
Musse, Soraia Raupp, and Daniel Thalmann. "Hierarchical model for real time simulation of virtual human crowds." IEEE Transactions on Visualization and Computer Graphics 7.2 (2001): 152-164.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Ruiz, Sergio, et al. "Reducing memory requirements for diverse animated crowds." Proceedings of Motion on Games. ACM, 2013.
Seo et al., "Compression and Direct Manipulation of Complex Blendshape Models", Dec. 2011, in 10 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Ulicny, Branislav, and Daniel Thalmann. "Crowd simulation for interactive virtual environments and VR training systems." Computer Animation and Simulation 2001 (2001 ): 163-170.
Vigueras, Guillermo, et al. "A distributed visualization system for crowd simulations." Integrated Computer-Aided Engineering 18.4 (2011 ): 349-363.
Blanz V, Vetter T. A morphable model for the synthesis of 3D faces. In Proceedings of the 26th annual conference on Computer graphics and interactive techniques Jul. 1, 1999 (pp. 187-194). ACM Press/ Addison-Wesley Publishing Co.
Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.
Hu Gousheng, Face Analysis using 3D Morphable Models, Ph.D. Thesis, University of Surrey, Apr. 2015, pp. 1-112.
Blanz et al., "Reanimating Faces in Images and Video" Sep. 2003, vol. 22, No. 3, pp. 641-650, 10 pages.

\* cited by examiner

DYNAMIC TEXTURE MAPPING USING MEGATEXTURES

BACKGROUND

Texture mapping is a technique often used to provide surface details and textures to computer generated objects or models. For example, textures may be used in many video games to provide surface details to instances of objects in a game environment (for example, buildings, trees, rubble, and so forth).

In some games, instances of a particular object in a given game environment may use the same textures. In order to give variety to different instances of the objects in the game environment, a megatexture comprising texture information for all instances of objects of a particular type may be used. Each object instance in the game environment is mapped to a unique piece of the megatexture. Because each instance maps to a different portion of the megatexture, different instances of the object will appear to be different, creating a greater degree of visual variation within the game environment.

SUMMARY OF SOME EMBODIMENTS

The systems, methods, and devices of this disclosure each have several innovative aspects, no single one of which is solely responsible for the all of the desirable attributes disclosed herein.

One embodiment discloses a computer-implemented method comprising as implemented by an interactive computing system configured with specific computer-executable instructions during runtime of a game application, the game application including a game environment, identifying a plurality of instances of a virtual object within the game environment; providing a first version of the virtual object and a second version of the virtual object; providing a megatexture associated with the virtual object, the megatexture including a plurality of blend maps; for each instance of the virtual object of the plurality of instances of the virtual object, identifying a blend map of the plurality of blend maps associated with the instance of the virtual object, the blend map defining transform values for rendering the instance of the virtual object; rendering the instance of the virtual object by blending the first version of the virtual object with the second version of the virtual object, based at least in part on the transform values of the blend map, wherein individual transform values of the blend map indicate the degree at which the first version and the second version of the virtual object are blended together; and generating instructions to output the rendered instance of the virtual object.

Another embodiment discloses a system a data store configured to store a first version of a virtual object and a second version of the virtual object, and a megatexture associated with the virtual object, the megatexture including a plurality of blend maps; one or more processors configured with computer executable instructions that cause the one or more processors to execute a game application, the game application including a game environment, the game application configured to: identify a plurality of instances of a virtual object within the game environment; for each instance of the virtual object of the plurality of instances of the virtual object, identify a blend map of the plurality of blend maps associated with the instance of the virtual object, the blend map defining transform values for rendering the instance of the virtual object; render the instance of the virtual object by blending the first version of the virtual object with the second version of the virtual object, based at least in part on the transform values of the blend map, wherein individual transform values of the blend map indicate the degree at which the first version and the second version of the virtual object are blended together; and generate instructions to output the rendered instance of the virtual object.

Another embodiment discloses a non-transitory computer-readable medium storing computer-executable instructions that, when executed by one or more computing devices, configure the one or more computing devices to execute a game application, the game application configured to perform operations during runtime of the game application comprising: identifying a plurality of instances of a virtual object within the game environment; providing a plurality of versions of the virtual object; providing a megatexture associated with the virtual object, the megatexture including a plurality of blend maps; for each instance of the virtual object of the plurality of instances of the virtual object, identifying a blend map of the plurality of blend maps associated with the instance of the virtual object, the blend map defining transform values for rendering the instance of the virtual object; rendering the instance of the virtual object by blending a first version of the virtual object of the plurality of versions of the virtual object with a second version of the virtual object of the plurality of versions of the virtual object, based at least in part on the transform values of the blend map, wherein individual transform values of the blend map indicate the degree at which the first version of the virtual object and the second version of the virtual object are blended together; and generating instructions to output the rendered instance of the virtual object.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF SOME EMBODIMENTS

Overview

In some embodiments, megatextures may be used to specify blend maps for different instances of an object within a game environment. Each blend map may specify a blending between two or more different versions of the object. In some embodiments, the two or more different versions may correspond to different visual appearances associated with the object (for example, an undamaged object and a damaged object). In some embodiments, the blend map for an instance of the object may be updated based on one or more actions within the game environment, allowing for the visual appearance of the object instance to change within the game environment in response to various actions.

Overview of Video Game Environment

Figure 1:
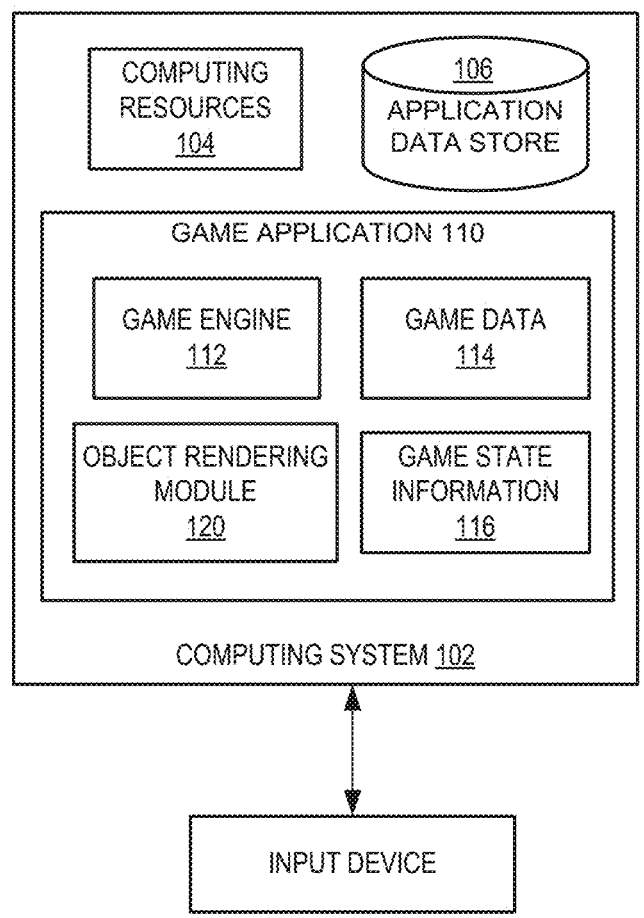
FIG. 1 illustrates an embodiment of a computing environment for implementing megatexturing and dynamic object texture changes for a game application.

FIG. 1 illustrates an embodiment of a computing environment 100 for implementing megatexturing and dynamic object texture mapping for a game application, that includes a user computing system 102 that can be utilized by a user. To simplify discussion and not to limit the present disclosure, FIG. 1 illustrates one user computing system 102, though multiple systems may be used. In some embodiments, the user computing system 102 may communicate via a network with a server or application host system (not shown).

For purposes of this disclosure the term "user" or "player" can refer to a person that is operating a computing device in order to control the operation of a game application (for example, to play the game). For purposes of this disclosure the term "character" can refer to an entity such as a virtual avatar or character that a user can control within a game application. The character can correspond to a person, vehicle, object, and/or any entity that the user can control within the game application.

The computing system 102 includes computing resources 104 and an application data store 106. The user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), wireless mobile devices (for example, smart phones, personal digital assistants, tablets, or the like), and so forth. A more detailed description of an embodiment of a computing system 102 is described below with respect to FIG. 10.

The user computing system 102 can execute a game application 110 based on software code stored at least in part in the application data store 106. The game application 110 may also be referred to as a videogame, a game, game code, and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, and other data structures. In the illustrated embodiment, the game application 110 includes a game engine 112, game data 114, game state information 116, and a object render module 120.

In some embodiments, the user computing system 102 is capable of executing a game application 110, which may be stored and/or executed in a distributed environment. For example, the user computing system 102 may execute a portion of a game and a network-based computing system (not shown), may execute another portion of the game. For instance, the game may be a massively multiplayer online role-playing game (MMORPG) that includes a client portion executed by the user computing system 102 and a server portion executed by a server or application host system.

Game Engine

The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, prerecorded motion capture poses/paths, environmental settings, constraints, skeleton models, route information, and/or other game application information.

The game engine 112 can execute gameplay within the game application 110 according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, jumps, runs, throws, attacks, and other events appropriate for the game application 110. During runtime operation, the game engine 112 can read in game data 114 and game state information 116 to determine the appropriate in-game events.

In one example, after the game engine 112 determines character events, the character events can be conveyed to a movement engine that can determine the appropriate motions the characters should make in response to the events, and those motions can be passed on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application, and may occur multiple times a second. Though the process has been described in the context of a character, the process can be applied to any process for processing events and rendering the output for display to a user during run-time of the game application.

Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in a remote data store (not shown) associated with the interactive computing system 130. In such embodiments, game data may be received during runtime of the game application.

Game State Information

During runtime, the game application 110 can store game state information 116, which can include a game state, character states, environment states, scene object storage, route information and/or other information associated with a runtime state of the game application 110. For example, the game state information 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game. In some embodiments, at least a portion of the game state information can be updated on a periodic basis, such as multiple times per second. In some embodiments, the game state information can be updated on an event-based basis.

Object Rendering Module

The object rendering module 120 can perform various functions to render instances of one or more objects that may be present in a game environment during the course of gameplay. In some embodiments, the object rendering module may be implemented as part of a skinning and rendering engine and/or a renderer (discussed above). As used herein, a "game environment" may refer to a virtual environment generated by the game engine 112 within which a character or other entities controlled by the user or the game application.

An "object" may refer to a definition of a computer generated model present within a game environment. For example, an object may correspond to a computer-generated representation of a rock, a tree, a building, and/or other entity that may be present within the game environment. In some embodiments, an object may correspond to a character or portion of the character controlled by the player or by the game engine. As discussed herein, an object may be associated with multiple versions (for example, a damaged and an undamaged version of the object).

An "instance" may refer to a specific usage of an object within a game environment. In some embodiments, multiple instances of the same object may be rendered in a game environment. For example, multiple instance of an object corresponding to a tree may be used to create a forest within the game environment.

In order to render instances of objects within a scene in the game environment to be displayed to a user, the instances may be mapped to textures specifying a surface appearance of the instance. For example, different textures may be used to convey a material associated with the object, such as fabric, stone, brick, wood, flesh, metal, and/or the like. For example, the game environment may include one or more instances of an object corresponding to a tree trunk, which may be associated with a texture having an appearance of tree bark.

In some embodiments, megatexturing may be used to create visual variety in different instances of an object within the game environment. For example, a megatexture may be implemented as a large texture image, wherein each instance of the object (for example, an instance of a tree trunk object) maps to a different portion of the megatexture, such that each of the rendered instances may be slightly different in textural appearance. In some embodiments, multiple megatextures may be used for an object, For example, each regions of the virtual environment may use a different megatexture for the object. By creating visual variety in the instances of the object rendered in the game environment, the game environment may be made to feel less artificial to the player and more realistic.

Object Rendering Using Blend Maps

In a conventional megatexturing scheme, a particular object may be associated with a megatexture implemented as one or more texture images. Each instance of the object can be mapped to a unique portion of the megatexture. This allows for visual variety in different instances of the object, as each instance will have a texture from a different portion of the megatexture. A conventional megatexture may be implemented as a large high-resolution image where each instance of the same object will be displayed in the game environment using a unique portion of the large high-resolution textures.

In accordance with some embodiments of dynamic texture mapping, a blend map may be implemented as a low-resolution megatexture. Each instance of an object within the game can be mapped to a unique portion of the blend map. Higher resolution versions of the object are used in conjunction with the blend maps to generate final rendered versions of the instances of the object within the game environment. The use of a low resolution megatexture improves the operation of the game application by the computing system by using less memory than a conventional megatexturing scheme, where a large high resolution megatexture can use a substantial amount of memory. The use of the low resolution megatexture can result in quicker load times of the megatexture and increased availability of memory for other aspects of operation of the game application. Additionally, as discussed in further detail herein, the use of a lower resolution blend map allows for the dynamic modification of blend maps during runtime of the game application. The dynamic modification of the blend maps provides for runtime generation of dynamic updates and rendering of instances of objects within the game environment.

In some embodiments, it may be desirable for the appearance of instances of an object in a game environment to be able to change dynamically over the course of gameplay. For example, during the course of gameplay, instances of object within the game environment may be altered or changed. In some embodiments, changes to an instance of an object in a game environment may comprise damage to the instance, which may include surface damage, scuffing, denting, and/or the like. In some embodiments, changes to an instance of an object may also result in a change in the size or shape of the instance. For example, as the instance of the object is damaged, it may become smaller, indicating the pieces of the instance have been chipped or blasted away. In some embodiments, if an instance of the object is modified a defined or threshold amount (for example, experiencing a threshold amount of damage), the instance may be removed from the environment or replaced with an instance of a different object.

In some embodiments, changes to an instance of an object in the game environment may occur as a result of a player action (for example, the player fires a weapon at the instance in the game environment). In other embodiments, instance in the game environment may be changed due to other sources (for example, an earthquake, an explosion, actions by computer-controlled characters, and the like). In some embodiments, how the changes to the instance of the object are displayed may be based on a location/orientation of the action relative to the instance, a magnitude of the action, and/or the like.

While the below examples may refer primarily to dynamic damage to instances of an object of the game environment, it is understood that that in other embodiments, other types of changes may be made to instances of the object, which may be based upon other events, such as rust, dust, snow, and/or the like. In some embodiments, changes to the instances of the objects may be additive, such as, for example, increase the size or shape of the instance. As one example, an object may increase in size due to snow, goo, or other material being added to the object. In other embodiments, as discussed above, changes to the instance may be subtractive (for example, decrease the size or shape of the instance). For example, an object may decrease in size upon being damaged.

In some embodiments, dynamic changes to an instance of an object may be implemented by blending multiple versions of the object. In some embodiments, in order to implement dynamic changes to the visual appearance of instances of the object in the game environment (for example, damage or other types of changes), the megatexture corresponding to the object may, instead of comprising the actual textures for the instances of the object, comprise a plurality of blend maps corresponding to the instances of the object. Each blend map may specify, for its corresponding instance, a blending between at least a first version of the object and a second version of the object. For example, in some embodiments, the first version of the object may correspond to an unchanged version of the object, while the second version of the object may correspond to a fully changed version of the object. Each version of the object may be associated with its own set of one or more attribute values, such as color, texture, size, or location. The blending between different versions of the object may comprise blending the attribute values associated with each of the different versions. For example, when blending between an unchanged and a changed version of an object, the blend map for a particular instance may specify, for each location on the instance, a blending value that indicates a level of blending between the color values of the different versions, the texture values of the different versions, the location values of the different versions, and/or the like.

By blending the unchanged and changed versions of the object, an instance of the object with changes as specified by the blend map can be rendered. In some embodiments, the blend map may comprise one or more grid elements. The blend map may be a lower resolution texture than the rendered version of the instance of the object within the game environment. Each grid element of the blend map may represent a corresponding location on the instance of the object, such as, for example, one or more pixels or group of pixels on the rendered instance of the object.

Figure 2:
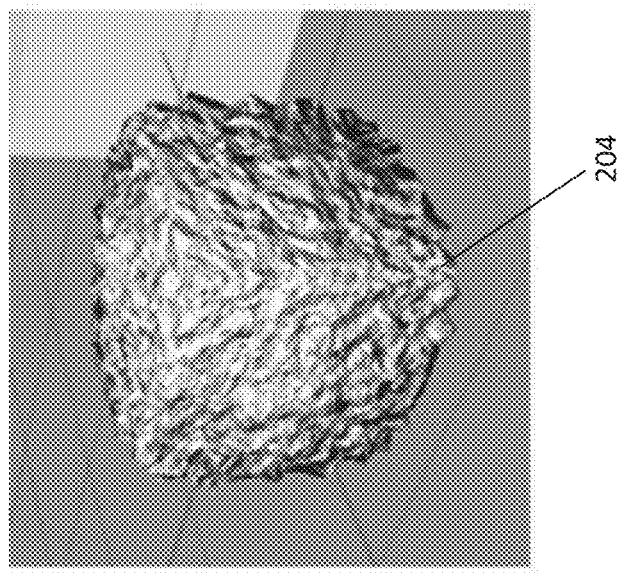
FIG. 2 illustrates embodiments of multiple versions of an object that can be used to implement dynamic texture mapping on objects within a virtual game environment.
Figure 2:
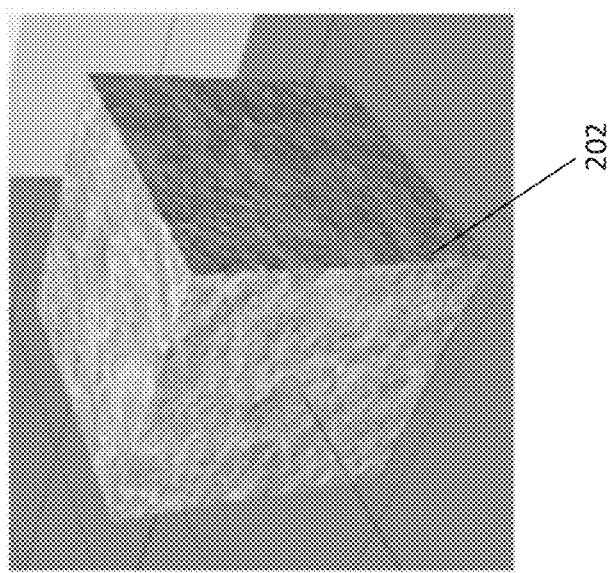

FIG. 2 illustrates example embodiments of multiple versions of an object that can be used to illustrate the principles of implementing dynamic texture mapping within a game environment. For example, object 202 corresponds to an unchanged version of an object of a particular object type, while object 204 corresponds to a fully changed version of the object (for example, a fully damaged version).

As illustrated in FIG. 2, the size or shape of object 204 may be different from that of object 202. For example, object 204, corresponding to a changed or damaged version of the object, may be smaller than unchanged object 202. An object within the game environment may be changed during runtime of the game application. For example, a player firing a weapon at an object in the game environment may damage an object. In doing so, the size of the object may decrease (for example, due to portions of the object being chipped or blasted away by the weapon).

Figure 3:
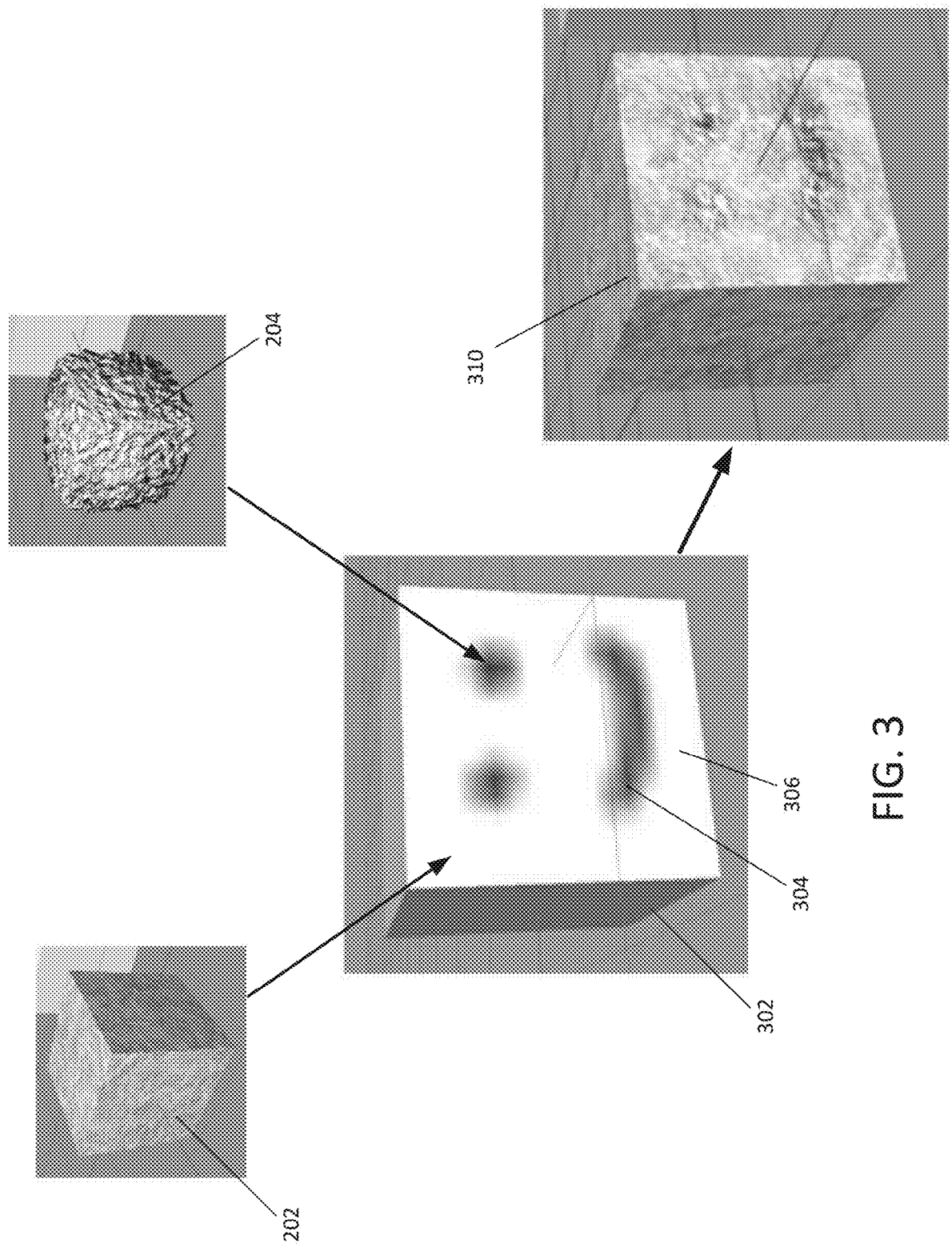
FIG. 3 illustrates an embodiment of dynamic texture mapping in a virtual game environment.

Unchanged object 202 and changed object 204 may be blended in order to display different instances of the object with varying degrees of change in the game environment. For example, an instance that is substantially unchanged may be rendered using primarily the version of the object 202 instead of the version of the object 204. On the other hand, an instance that has been heavily changed may be rendered primarily using the version of the object 204 instead of object 202. The object the version of the 202 and the version of the object 204 can be blended for a particular instance of the object in the game environment by using a blend map corresponding to the instance of the object. A blend map, such as illustrated in FIG. 3, may specify locations on a corresponding instance that are changed and a degree to which they are changed. The blending of the versions of the objects may use displacement mapping to change the size and the shape of the instance of the object.

FIG. 3 illustrates embodiments of multiple versions of a particular object type that may be blended to form a rendered texture for an instance of the object within a game environment. Each instance of the object in the game environment can be mapped to a unique portion of the megatexture for the object. The megatexture can also be referred to as a blend map 302. The blend map 302 may be used to blend multiple versions of the object (for example, the version of the object 202 and the version of the object 204), in order to generate instances of the object with varying display characteristics (for example, different degrees of change) within the game environment.

The blend map can include various characteristics that determine how the instance is rendered within the game environment. For example, the darker regions of the blend map (for example, regions 304) may correspond to regions of the instance that are changed (for example, changed object 204). The lighter regions 306 of the blend map may correspond to regions of the instance that are unchanged (for example, unchanged object 202). As such, in the rendered instance 310, portions of the instance 310 corresponding to the darker regions 304 of the blend map 302 are blended using primarily changed object 204 over unchanged object 202, while portions of the instance 310 corresponding to the lighter regions 306 of the blend map 302 are blended using primarily unchanged object 202 over changed object 204.

In some embodiments, as discussed above, the megatexture comprising one or more blend maps may be implemented as a low-resolution image. Each location, point, pixel, or other discrete element (for example, a grid element) of the blend map may correspond to a value, which may be referred to a transform value, within a certain range (for example, between 0 and an integer) corresponding to a degree of blending between the object version 202 and object version 204, wherein 0 corresponds object 202 only, n corresponds to object version 204 only, and values in between correspond to a level of blending between the versions of the objects 202 and 204, based upon one or more blending rules. As a result, a size of the blend maps may be much smaller in comparison to the high-definition texture maps that may be used in a conventional megatexturing scheme. Because the objects the versions of the 202 and 204 (which may be implemented as high-definition textures or models) each correspond to a single object, while the megatexture comprises texture data for all instances of the object in the game environment, the amount of storage needed to implement blend maps using the megatexture may potentially be much smaller in comparison to a conventional megatexturing scheme where the megatexture comprises the full high-resolution texture for all instances of the object in the game environment. In addition, by implementing the blend map as a low-resolution texture, it may be quickly changed or updated (for example, to account for dynamic damage or other alterations to the object during the course of gameplay).

Figure 4A:
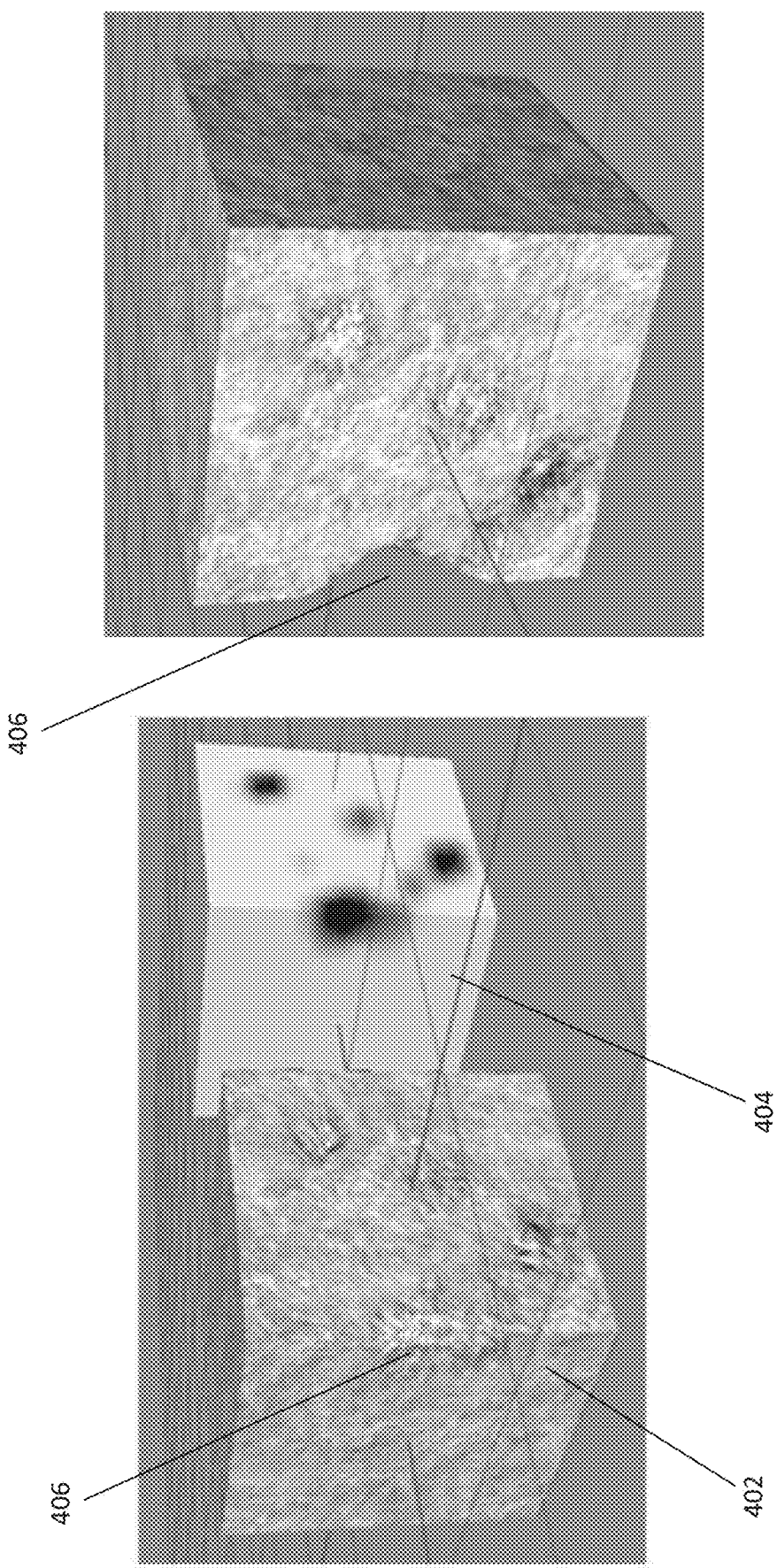
FIGS. 4A and 4B illustrate additional embodiments of dynamic texture mapping.
Figure 4B:
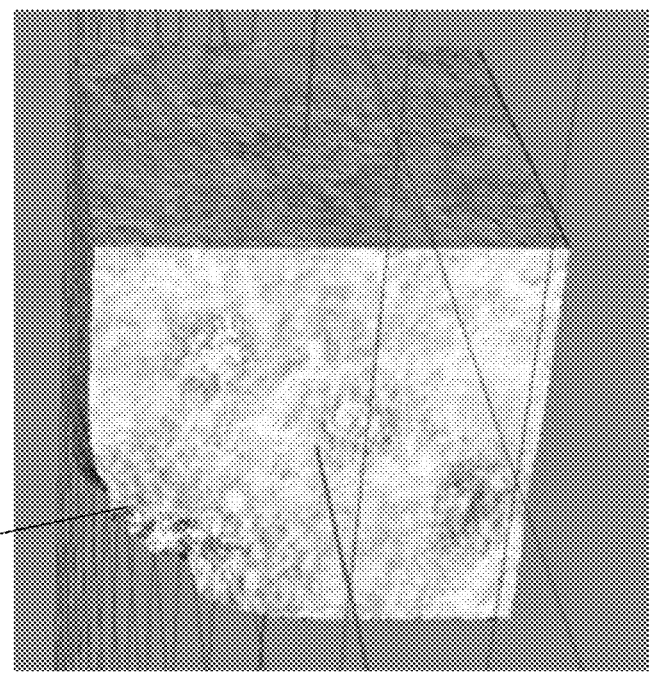
Figure 4B:
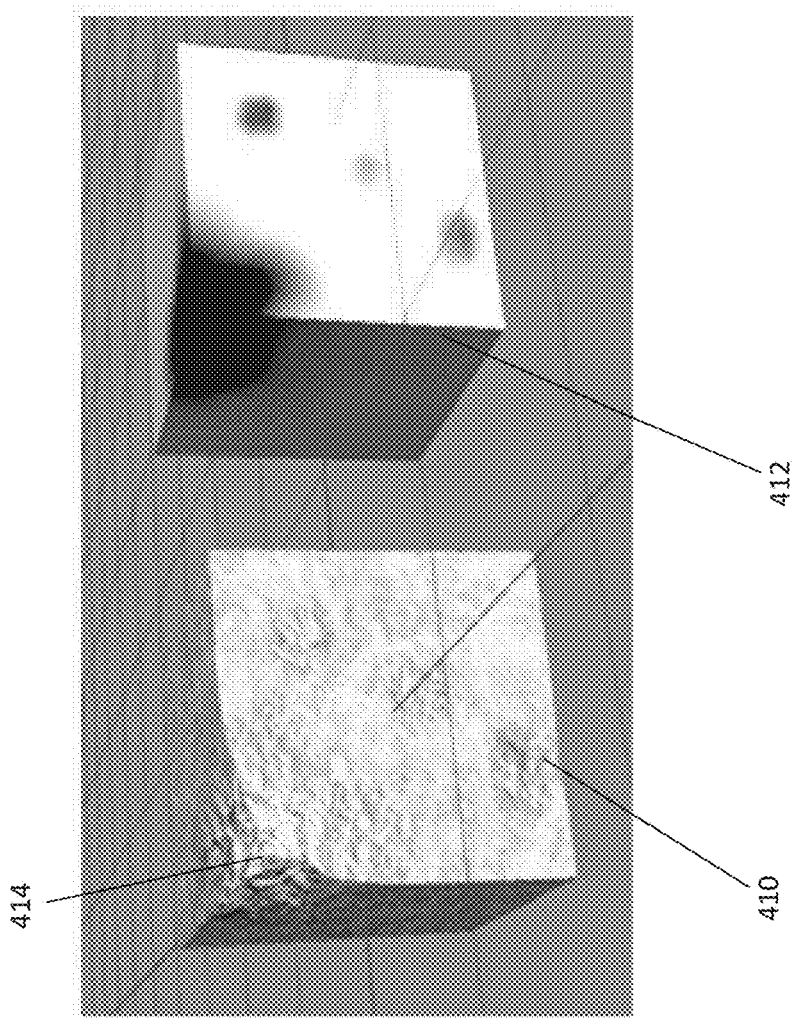

Using a blend map to specify a blending of two or more different versions of an object potentially allows for a large variety in visual appearances of instances of the object within a game environment. For example, FIGS. 4A and 4B illustrate embodiments of differently rendered instances and their respective blend maps. In some embodiments, different types of actions (for example, actions performed by the user) may create different types of changes on instances in the game environment. For example, the user may fire a weapon at an instance in the game environment, wherein the damage inflicted on the instance may be based upon a type of weapon fired. The actions affecting the instances may cause the blend map to be dynamically updated with updated values. In some embodiments, the alterations to the blend map for an instance may be based upon a type of action performed and one or more locations on the object associated with the action (for example, damage from a grenade can be different from damage caused by a shotgun blast). The blend map can be updated to increase the damage values of one or more locations based on the action).

FIG. 4A illustrates an embodiment of a rendered instance 402 within the game environment. The blend map 404 corresponds to the instance 402, wherein the instance 402 may have experienced damage (for example, from a weapon, such as a gun, fired by a player). FIG. 4B illustrates another embodiment of a rendered instance 410 with a different blend map 412, the instance 412 may have experienced damage from heavier weapons (for example, rockets, and grenades) and/or large impacts within a game application. Because the blend map 412 corresponding to the instance of the object 410 is different from the blend map 404 corresponding to the instance of the object 402, the instance of the object 410 and the instance of the object 402 will be rendered differently in the game environment, even though both instances are of the same type of object and rendered based on the versions of the object 202 and 204.

In some embodiments, if an action is performed repeatedly on the same area of the instance (for example, a user repeatedly fires a gun at a particular location on the instance), the intensity values (for example, indicating damage) of the location of the blend map may continue to increase. In some embodiments, adding additional change or damage onto an already changed or damaged area of the instance may cause one or more areas surrounding the changed or damaged area to be changed or damaged. In some embodiments, how change or damage is added to the instance may be based upon one or more change or damage rules associated with the game application.

As illustrated in FIGS. 4A and 4B, because the changed version of the object (for example, damaged object 204) may have a different shape than the unchanged version of the object (for example, undamaged object 202), the shapes of the rendered instance 402 and 410, as well as the associated markers, may be different from that of the unchanged object. For example, corresponding locations on different versions of the object (for example, undamaged object 202 and damaged object 204) may be displaced relative to each other. Thus, in instances 402 and 410, at locations where damage has occurred, the blending of the different versions of the object may result in a shape that is between the fully damaged object 204 and undamaged object 202, based on an intensity level of the register in the blend map. For example, locations 406 and 414 on instances 402 and 410 respectively correspond to locations on their corresponding blend maps that indicate heavy damage. As such, the shapes of the instances at those locations may conform more to the shape of the damaged version of the object 204 rather than of the undamaged version of the object 202.

In some embodiments, additional decals or layers may be applied on top of an instance to provide further visual effects (for example, bullet holes, smoke damage, burning embers, and/or the like), based upon a type of activity that caused the change to the instance.

Dynamic Mapping Process

Figure 5:
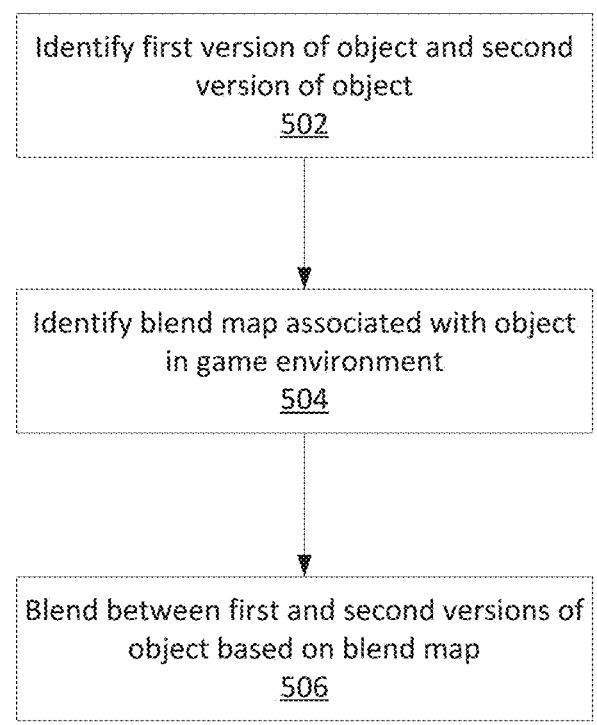
FIG. 5 illustrates an embodiment of a flowchart of a process for using a blend map to render an object within a game environment.

FIG. 5 illustrates an embodiment of a flowchart of a process for dynamic texture mapping using a blend map to render an instance of an object in a game environment. The process can be implemented by any system that can configure various instructions for rendering an object in a virtual environment of a game application. For example, the process, in whole or in part, can be implemented by an object rendering module 120 or other application engine or module of game application 110. Although any number of systems, in whole or in part, can implement the process, to simplify discussion, the process will be described with respect to particular systems. Although embodiments of the process may be performed with respect to variations of systems comprising various game application environments, to simplify discussion, the process will be described with respect to the object rendering module 120.

At block 502, at least two different versions of an object are provided to the object rendering module 120 (for example, from application data store 106), comprising at least a first version of the object and a second version of the object. For example, the first version of the object may comprise an unaltered version of the object, while the second version of the object may comprise an altered version of the object. Each version of the object may be associated with a set of attributes value (for example, color, texture, size/location, and/or the like). In some embodiments, additional versions of the object may also be used. For example, versions associated with other types of visual changes may be identified, such as, for example, damage, dust, denting, snow, goo, and/or the like.

At block 504, the object rendering module 120 identifies a blend map associated with an instance of the object in the game environment. In some embodiments, the blend map comprises a portion of a megatexture, wherein the megatexture comprises blend map information for a plurality of instances of the object in the game environment. Each instance of the object in the game environment may be mapped to a unique location on the megatexture, such that each instance of the object will have its own blend map. In some embodiments, the blend map specifies values for different locations on the corresponding instance, each value indicating an alteration level of the two or more different versions of the object (for example, the first version and the second version). For example, the values specified by the blend map may indicate a level of blending between each of the different attributes of the different versions of the object.

At block 506, the object rendering module 120 renders the instance by blending the different versions of the object (for example, the first and second versions of the object), based the blend map associated with the instance. The blending may comprise blending between each of the different attribute values of the different versions of the object. For example, locations on the instance may be rendered with attributes values that correspond to an intermediate between the attribute values of the first and second versions of the object, based upon a value associated with the corresponding locations on the blend map and/or one or more blending rules. In some embodiments, an interpolation between the different versions of the object may be based the value of the blend map and used to determine a final rendered visual appearance of corresponding locations on the instance. Blending the different versions of the object can include displacement mapping where the size and shape of the instance of the object is changed during rendering. In some embodiments, one or more blending effects may be applied between different regions of the instance (for example, between unchanged and changed regions on the instance). In some embodiments, the blending is performed using one or more blending rules, which may be based upon a material associated with the object, a type of the different versions of the object (for example, damage, denting, snow, and so forth), and/or the like.

Dynamic Object Modifications

As discussed above, in some embodiments the visual appearance of an instance of an object may dynamically change as result of various actions during gameplay. For example, as a player performs actions relating to an instance (for example, walking over the instance, striking the instance, firing a weapon at the instance, and/or the like), the visual appearance of the instance may change dynamically in response to the actions. For example, the player firing a weapon at an instance may cause the instance to become damaged, wherein the level of damage to the instance may increase as the player continues to fire on the object. In some embodiments, certain instances in the game environment may also change in response to actions other than those performed by the player (for example, actions by other players, actions by computer-controlled characters, and/or the like). For example, the game engine may implement weather effects in the game environment, which may cause one or more instance in the game environment may be altered by the environmental effects, for example, instance may appear snow-covered.

Figure 6:
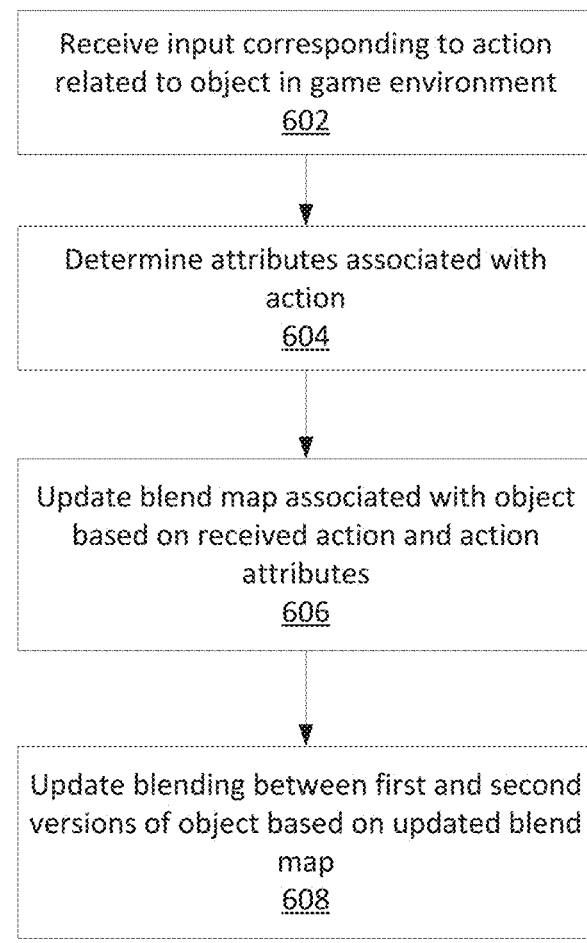
FIG. 6 illustrates an embodiment of a flowchart of process for displaying dynamic changes to objects in a game environment.

FIG. 6 illustrates an embodiment of flowchart of a process for displaying dynamic changes to instances in a game environment. The process can be implemented by any system that can configure various instructions for rendering an instance of an object in a virtual environment of a game application. For example, the process, in whole or in part, can be implemented by one or more engines or modules of game application 110, such as object rendering module 120, game engine 112, game data 114, and game state information 116. Although any number of systems, in whole or in part, can implement the process, to simplify discussion, the process will be described with respect to particular systems.

At block 602, an input is received corresponding to an action related to an instance of an object in the game environment. The action may correspond to an action performed by a player of the game, an action performed by the game engine, and/or the like. For example, a player may, during the course of gameplay, control a character to walk over the instance, strike the instance, fire a weapon at the instance, and/or the like. In some embodiments, the input may be received by the game engine 112.

At block 604, one or more attributes of the action are determined. For example, in some embodiments, the action may be associated with a type, a magnitude, an area of effect (for example, number of grid elements affected on the blend map), and a location, and/or the like. For example, in some embodiments, the player may be able to fire different types of weapons at the instance, wherein each weapon may be associated with a magnitude (for example, a pistol may be associated with a small magnitude, while a rocket launcher may be associated with a large magnitude) and an area of effect (for example, a pistol may only affect a small number of grid elements on a blend map, while a rocket launcher may affect a larger number of grid elements of a blend map).

At block 606, the blend map corresponding to the instance is updated by the game engine 112 and/or object rendering module 120, based at least in part upon the received action and attributes associated with the action. For example, a value of the blend map at locations corresponding to the received action may be updated based upon a magnitude of the action (for example, larger magnitude of action may correspond to greater change in value of blend map). In some embodiments, a change in a value at a location on the displacement may also be based upon an existing value at the location on the blend map, the location on the instance, and/or the like.

In some embodiments, an area of the blend map updated may be based upon a magnitude of the action. For example, an action having a small magnitude may only affect a small area of the blend map around the location of the action, while an action having a large magnitude many affect a larger area of the blend map around the location of the action.

In some embodiments, a magnitude and area of change to the blend map may be based upon a type of the action and/or one or more attributes associated with the object. For example, an action corresponding to a sword slice and an action corresponding to a pistol shot may have similar magnitudes, but may affect different areas of the blend map (for example, a narrow line or a circular area around a center point). In some embodiments, the change to the blend map may be based upon one or more attributes of the object (for example, a material associated with the object). For example, blend maps corresponding to an instance of a wood object and an instance of a concrete object may be updated differently, even if the action is the same.

At block 608, the visual appearance of the instance is updated based upon the updated blend map. For example, the blending between a first unchanged version and a second changed version of the object may be updated based upon the updated values of the blend map. As such, the visual appearance of the instance may be updated such that it reflects the actions performed by the players or other entities in the game environment. In some embodiments, a size or shape of the instance may change based upon the updated blend map. In some embodiments, an updated boundary may be calculated for the instance.

By updating instances in response to actions during the course of gameplay, the game environment may be made more dynamic and interactive. The use of blend maps to blend different versions of the object makes possible for many different variations in the physical appearance of instances of the object in the game environment. In addition, the changes to the instances can be made to more accurately reflect the effects of player actions and/or actions of other entities in the game environment.

Dynamic Object Size/Shape

As discussed above, in some embodiments the sizes and shapes of different versions of an object may be different. For example, a changed version of an object may be smaller when compared to an unchanged version of the object, to reflect portions of the object being chipped or blasted away due to the damage. In some embodiments, different versions of the object may have a larger footprint than the unchanged version of the object. For example, a snow-covered version of the object may be larger to reflect the addition of snowfall on the object. In some embodiments, a version of the object may be larger in some areas of the object but smaller in others.

Figure 7:
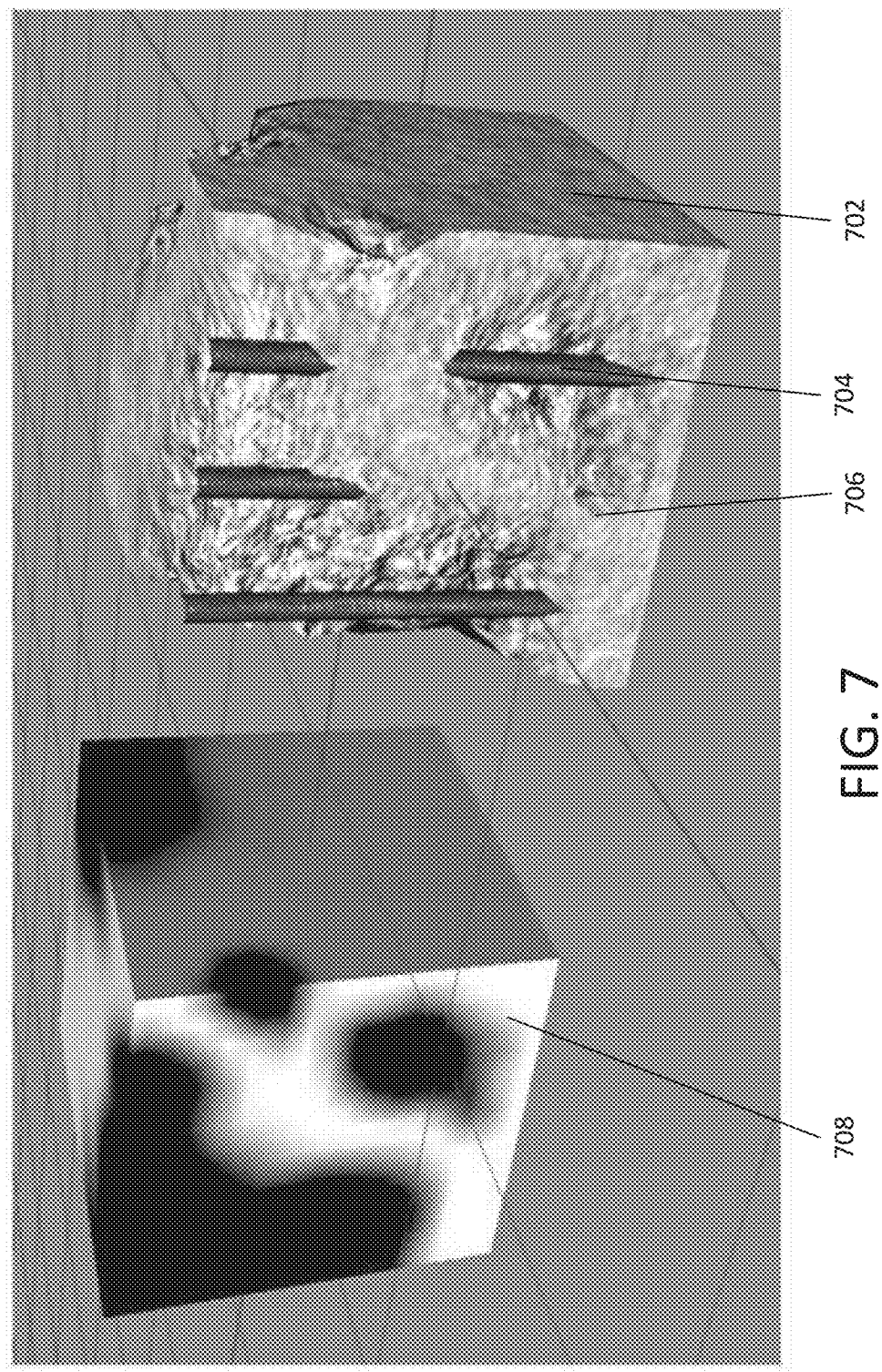
FIG. 7 illustrates an embodiment of dynamic texture mapping used with a plurality of layers overlapping objects.

In some embodiments, additional second objects may be merged. For example, an instance of a second object may be positioned beneath a surface of an instance of a first object in a game environment, which may become revealed as the instance of the first object is altered (for example, damaged). FIG. 7 illustrates an example of overlapping object instances being exposed in response to dynamic changes, in accordance with some embodiments. As illustrated in FIG. 7, a first instance 702 corresponding to a first object (for example, concrete block) is positioned to overlap with instances 704 corresponding to a second object (for example, a plurality of vertical rebar shafts). In the illustrated embodiment, the rebar 704 is positioned behind a front surface 706 of the concrete block 702, such that the rebar 704 may not be visible when the concrete block 702 is undamaged. However, as the concrete block 702 experiences damage (for example, due to a player firing a weapon at the concrete block 702), indicated by blend map 708, the boundary of the concrete block 702 may change such that the rebar 704 is exposed and visible. For example, blend map 708 indicates a high amount of damage near the top left corner of the concrete block 702. As such, because the damaged version of the object is smaller than the default undamaged version of the object, the top-left corner of concrete block 702 will appear to lose material, such that the rebar 704 will become exposed.

In some embodiments, where an instance of an object changes such that the instance increases in size (for example, due to added snow, goo, and/or the like), an instance of a second object located above or in front of the instance may become obscured. For example, an instance branch object may be placed on top of an instance of a stone object. During the course of gameplay, it may be possible for the instance of the stone object to be covered in snow (for example, using a snowed version of the object), such that the instance of the branch object is obscured. If at a later time the instance of the stone object begins to revert to an un-snowed version (for example, due to the snow melting), the instance of the branch object may once again become visible.

Blending Types

In some embodiments, different types of objects may be associated with different types of alterations (for example, damage). For example, an instance of a stone object may exhibit different characteristics when damaged in comparison to an instance of a metal object. In some embodiments, these differences may be reflected in different versions of the object. In addition, different rules for blending or updating the blend map may be used to reflect the differences in different types of changes.

Figure 8:
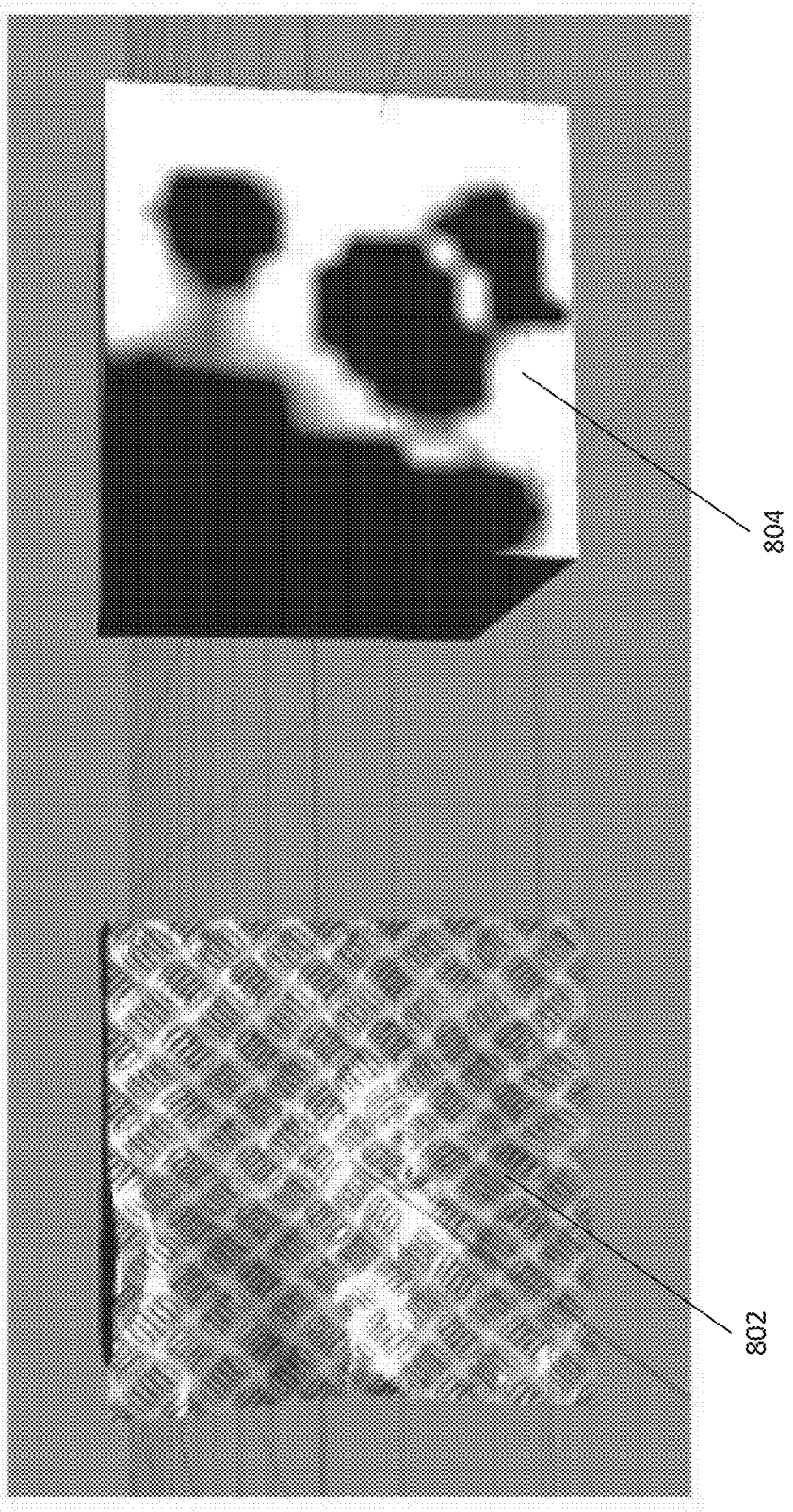
FIG. 8 illustrates another embodiment of dynamic texture mapping.

FIG. 8 illustrates an instance metal object 802 that may experience denting during the course of gameplay, and a corresponding blend map 804. In some embodiments, denting may be expressed differently from normal damage. For example, an action that may cause damage to a concentrated area in an instance of a first object (for example, a concrete object) may cause damage to a wider area in an instance of a second object (for example, a metal object, wherein the metal surface may dent inwards over a larger area compared to the concrete object). As such, how the blend map for the instance is updated in response to actions may be based upon one or more attributes of the object (for example, a material associated with the object).

In addition, in some embodiments, how different versions of the object are blended may be based upon the versions of the object (for example, damage, denting, and/or the like) and/or one or more attributes of the object (for example, a material associated with the object). For example, for damaged instances (for example, instance 410 illustrated in FIG. 4B), there may be a sharp angle or edge between undamaged and undamaged portions of the instance. On the other hand, for dented instances, the border between dented and undented portions of the instance may have more gradual angles or edges. In some embodiments, how different versions of the object are blended may be based upon one or more models (for example, a damage model, denting model, and/or the like).

Blending Prioritization

While the above examples refer primarily to damage, it is understood that blending may be performed using other versions of the object corresponding to other types of changes or alterations (for example, snow, goo, dust, and/or the like). In some embodiments, the rendered instance of an object may be blended using more than two versions of the object. For example, an instance of an object in the game environment may be damaged as well as covered in snow. In some embodiments, the different versions of the object may be blended based upon one or more prioritizations indicating an order of operations between the different versions of the objects (for example, the different versions of the objects may be blended such that an additive version of the object, such as snow, is always on top of a subtractive version of the object, such as the damaged version of the object). In some embodiments, the prioritizations may also affect how the blend map is updated in response to actions in the game environment (for example, actions that would damage the object would eliminate the snow on the object first before causing damage).

Figure 9:
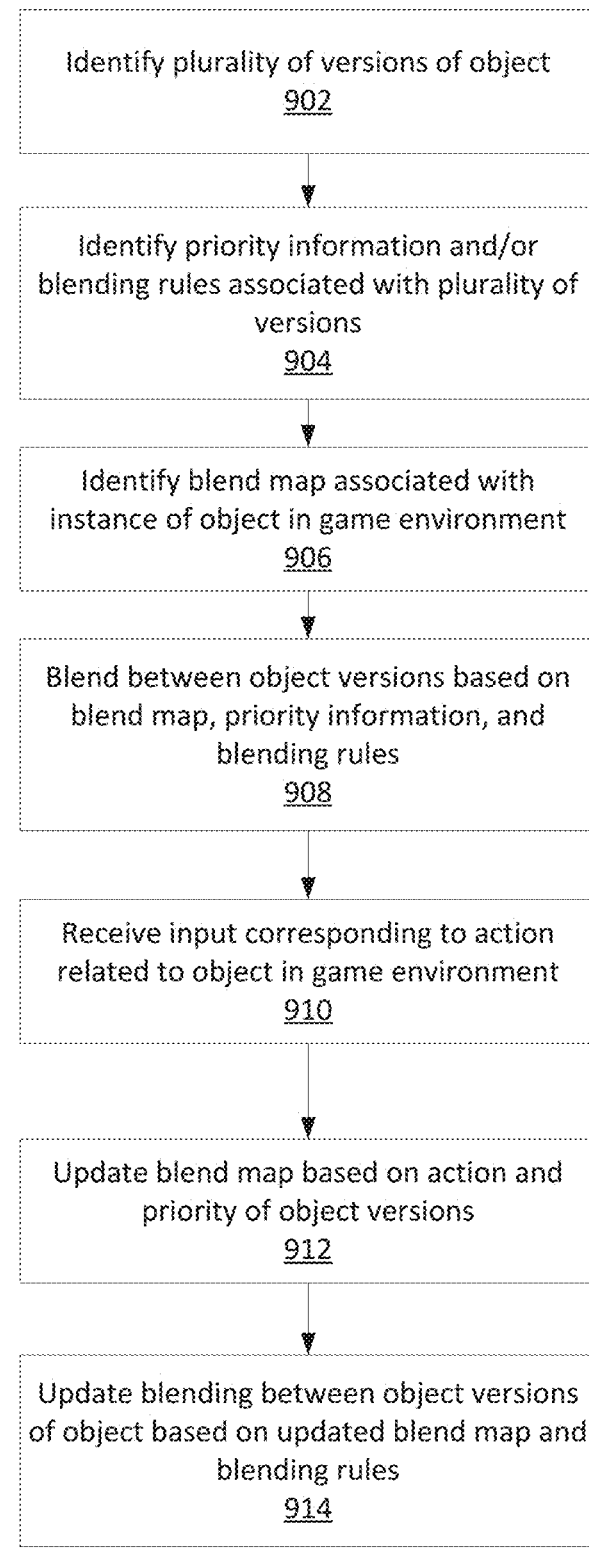
FIG. 9 illustrates an embodiment of a flowchart of a process for blending between different versions of an object.

FIG. 9 illustrates an embodiment of flowchart of a process for blending between different versions of an object. The process can be implemented by any system that can configure various instructions for rendering an instance of an object in a virtual environment of a game application. For example, the process, in whole or in part, can be implemented by one or more engines or modules of game application 110, such as object rendering module 120, game engine 112, game data 114, and game state information 116. Although any number of systems, in whole or in part, can implement the process, to simplify discussion, the process will be described with respect to particular systems.

At block 902, a plurality of different versions of an object are identified (for example, by the object rendering module 120). The different versions of the objects may include a default version of the object (for example, an undamaged version), one or more subtractive versions of the object (for example, a damaged or dented version of the object), one or more additive versions of the object (for example, a snowed version of the object wherein the object is covered by an additive layer of snow), and/or the like.

At block 904, priority information and/or blending rules associated with the different versions of the object may be identified. In some embodiments different versions of the object may be blended in different ways. For example, a blending between a damaged and a default undamaged version of the object may be different between a blending between the default version of the object and a snowed version of the object.

In some embodiments, priority information between the versions of the object may indicate in order of operations in blending the different versions of the object. For example, when blending a default version, an additive version, and a subtractive version of an object, the additive version may be blended after the subtractive version of the object, such that the additive version of the object may appear on the surface of the instance when blended (for example, blending a default, a damaged, and a snowed version of the object may be done such that the snow appears above the damaged portions of the instance).

At block 906, a blend map associated with an instance of the object in the game environment is identified. In some embodiments, the object may be associated with a megatexture, wherein the megatexture comprises blend map data for a plurality of instances of the object. The blend map may be identified based upon a location on the megatexture corresponding to the instance. The blend map may specify a blending between different versions of the object. For example, the blend map may comprise one or more values corresponding to different locations on the instance, each value indicating a blending level between two or more different versions of the object. At block 908, blending between the different versions of the object is performed based upon the blend map, priority information, and blending rules.

At block 910, an indication is received of an action performed in the game environment associated with the instance of the object. In some embodiments, the action may correspond to an action performed by the player. In some embodiments, the action may be from a source in the game environment other than the player. The action may be associated with a location on the instance, an action type, an action magnitude, and/or the like.

At block 912, the blend map is updated based upon the received action (for example, received by the game engine 112). In some embodiments, the action may be associated with a subset of the plurality of different versions of the object. For example, certain types of action may be associated with an additive version of the object in the blend map (for example, snowing), while other types of objections may be associated with both an additive version of the object and a subtractive version of the object (for example, an attack on the object may eliminate snow and cause damage to the instance). In some embodiments, an area of the blend map updated may be determined based upon a location of the action, a magnitude of the action, a type of the action, and/or the like.

At block 914, the instance is updated by updating the blending between the different versions of the object, based upon the updated blend map and the blending rules. In some embodiments, one or more additional visual effects may be applied to the instance, based upon one or more attributes of the action.

Overview of Computing Device

Figure 10:
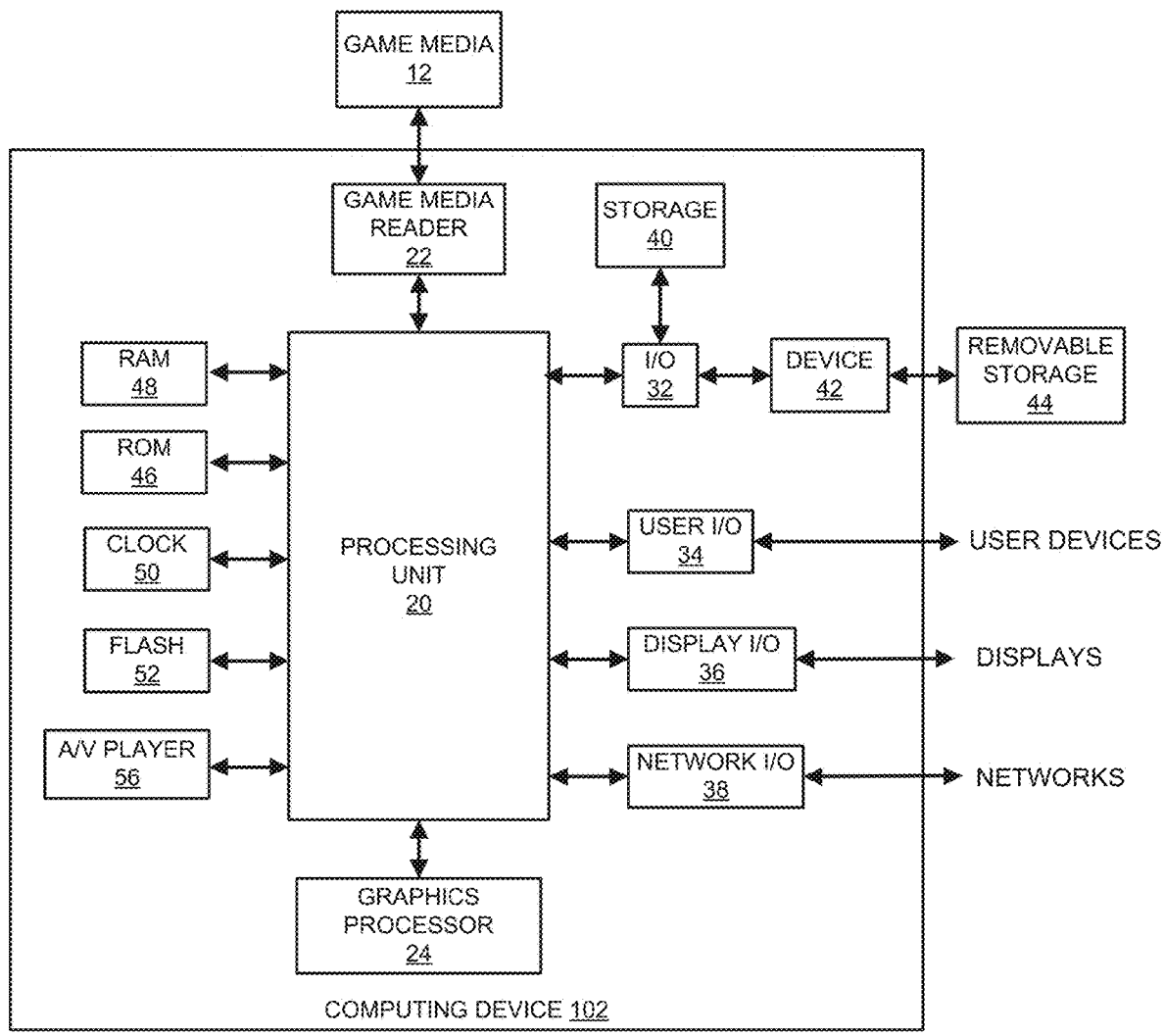
FIG. 10 illustrates an embodiment of computing device according to the present disclosure.

FIG. 10 illustrates an embodiment of computing device 102 according to the present disclosure. Other variations of the computing device 102 may be substituted for the examples explicitly presented herein, such as removing or adding components to the computing device 102. The computing device 102 may include a game device, a smart phone, a tablet, a personal computer, a laptop, a smart television, a car console display, a server, and the like. As shown, the computing device 102 includes a processing unit 20 that interacts with other components of the computing device 102 and also external components to computing device 102. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 102 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 102 may include a discrete graphics processor 24 that is separate from the processing unit 20. In some such cases, the graphics processor 24 may have separate RAM from the processing unit 20. Computing device 102 might be a handheld video game device, a dedicated game console computing system, a general-purpose laptop or desktop computer, a smart phone, a tablet, a car console, or other suitable system.

Computing device 102 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 102. Processing unit 20 can communicate through I/O 32 to store data, such as game state data and any shared data files. In addition to storage 40 and removable storage media 44, computing device 102 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 102 on a display device, such as graphics, user interfaces, video, and/or other visual content. Computing device 102 may comprise one or more integrated displays configured to receive display output signals produced by display I/O 36. According to some embodiments, display output signals produced by display I/O 36 may also be output to one or more display devices external to computing device 102, such a display 16.

The computing device 102 can also include other features that may be used with a game, such as a clock 50, flash memory 52, and other components. An audio/video player 56 might also be used to play a video sequence, such as a movie. It should be understood that other components may be provided in computing device 102 and that a person skilled in the art will appreciate other variations of computing device 102.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 102 is turned off or loses power.

As computing device 102 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions during runtime of a game application, the game application including a game environment,
identifying a plurality of instances of a virtual object for display within the game environment;
providing a first version of the virtual object and a second version of the virtual object, wherein the first version is an unaltered version of the virtual object and the second version is an altered version of the virtual object, wherein the first version and the second version of the virtual object are used for rendering each of plurality of instances of the virtual object within the game environment;
providing a megatexture including a plurality of blend maps associated with the virtual object, wherein each instance of the plurality of instances of the virtual object is associated with a unique blend map of the plurality of blend maps, wherein each blend map defines a plurality of grid elements, wherein each grid element corresponds to a plurality of pixels at a defined location of a particular instance of the virtual object, wherein each defined location of the particular instance of the virtual object corresponds to the same location of the first version of the virtual object and the second version of the virtual object, wherein each grid element has a corresponding transform value used for rendering each instance of the virtual object, wherein each transform value of each blend map indicates a degree of blending between the unaltered version of the virtual object and the altered version of the virtual object at the defined location of the particular instance of the virtual object that corresponds to a particular grid element;
for each instance of the virtual object of the plurality of instances of the virtual object within the game environment:
identifying a particular blend map of the plurality of blend maps associated with the particular instance of the virtual object;
rendering the particular instance of the virtual object by blending the first version of the virtual object with the second version of the virtual object based at least in part on the transform values of the particular blend map resulting in a rendered instance of the virtual object; and
generating instructions to output the rendered instance of the virtual object within the game environment.

2. The computer-implemented method of claim 1, further comprising:
receiving an indication of an action performed in the game environment affecting a first instance of the plurality of instances of the virtual object;
identifying one or more attributes associated with the action;
updating one or more of the transform values of a first blend map of the plurality of blend maps associated with the first instance of the virtual object, based at least in part on the identified one or more attributes associated with the action; and
updating the rendered instance of the virtual object by blending between the first version of the virtual object and the second version of the virtual object, based at least in part on the one or more transform values of the first blend map.

3. The computer-implemented method of claim 2, wherein the action corresponds to a player-inputted command.

4. The computer-implemented method of claim 2, wherein the one or more attributes associated with the action comprise at least one of: a type of action, a magnitude of the action, or a location associated with the action.

5. The computer-implemented method of claim 1, wherein the second version of the virtual object is smaller or larger than the first version of the virtual object.

6. The computer-implemented method of claim 1, wherein the blending is performed based, at least in part, on one or more blending rules, wherein the one or more blending rules are based at least in part on a type of the virtual object.

7. The computer-implemented method of claim 1 further comprising providing a third version of the virtual object, and the blending is performed based on one or more prioritization rules indicating an order of operations in blending between the first version, the second version, and the third version of the virtual object.

8. A system comprising:
memory configured to store a first version of a virtual object and a second version of the virtual object, and a megatexture including a plurality of blend maps associated with the virtual object, wherein the first version and the second version of the virtual object are used for rendering instances of the virtual object within a game environment;
one or more processors configured with computer executable instructions that cause the one or more processors to execute a game application, the game application including the game environment, the game application configured to:
identify a plurality of instances of the virtual object for display within the game environment;
provide the first version of the virtual object and the second version of the virtual object;
provide the megatexture including the plurality of blend maps associated with the virtual object, wherein each instance of the plurality of instances of the virtual object is associated with a unique blend map of the plurality of blend maps, wherein each blend map defines a plurality of grid elements, wherein each grid element corresponds to a plurality of pixels at a defined location of a particular instance of the virtual object, wherein each defined location of the particular instance of the virtual object corresponds to the same location of the first version of the virtual object and the second version of the virtual object, wherein each grid element has a corresponding transform value used for rendering each instance of the virtual object, wherein each transform value of each blend map indicates a degree of blending between the first version of the virtual object and the second version of the virtual object at the defined location of the particular instance of the virtual object that corresponds to a particular grid element;
for each instance of the virtual object of the plurality of instances of the virtual object within the game environment:

identify a particular blend map of the plurality of blend maps associated with the particular instance of the virtual object;

render the particular instance of the virtual object by blending the first version of the virtual object with the second version of the virtual object based at least in part on the transform values of the particular blend map resulting in a rendered instance of the virtual object; and generate instructions to output the rendered instance of the virtual object within the game environment.

9. The system of claim 8, wherein the computer executable instructions further configure the game application to:

receive an indication of an action performed in the game environment affecting a first instance of the plurality of instances of the virtual object;

identify one or more attributes associated with the action;

update one or more transform values of a first blend map of the plurality of the blend maps associated with the first instance of the virtual object, based at least in part on the identified one or more attributes associated with the action; and update the rendered instance of the virtual object by blending between the first version of the virtual object and the second version of the virtual object, based at least in part on the one or more transform values of the first blend map.

10. The system of claim 9, wherein the action corresponds to a player-inputted command.

11. The system of claim 9, wherein the one or more attributes associated with the action comprise at least one of: a type of action, a magnitude of the action, or a location associated with the action.

12. The system of claim 8, wherein the first version of the virtual object is a default version of the virtual object.

13. The system of claim 12, wherein the second version of the virtual object is smaller or larger than the default version of the virtual object.

14. The system of claim 8, wherein the blending is performed based, at least in part, on one or more blending rules, wherein the one or more blending rules are based at least in part on a type of the virtual object.

15. The system of claim 8, wherein the computer executable instructions further configure the game application to provide a third version of the virtual object, and wherein the blending is performed based on one or more prioritization rules indicating an order of operations in blending between the first version, the second version, and the third version of the virtual object.

16. A non-transitory computer-readable medium storing computer-executable instructions that, when executed by one or more computing devices, configure the one or more computing devices to execute a game application, the game application configured to perform operations during runtime of the game application comprising:

identifying a plurality of instances of a virtual object for display within a game environment of the game application;

providing a plurality of versions of the virtual object including a first version of the virtual object and a second version of the virtual object, wherein the plurality of versions of the virtual object are used for rendering each of plurality of instances of the virtual object within the game environment;

providing a megatexture including a plurality of blend maps associated with the virtual object, wherein each instance of the plurality of instances of the virtual object is associated with a unique blend map of the plurality of blend maps, wherein each blend map defines a plurality of grid elements, wherein each grid element corresponds to a plurality of pixels at a defined location of a particular instance of the virtual object, wherein each defined location of the particular instance of the virtual object corresponds to the same location of the first version of the virtual object and the second version of the virtual object, wherein each grid element has a corresponding transform value used for rendering each instance of the virtual object, wherein each transform value of each blend map indicates a degree of blending between the first version of the virtual object and the second version of the virtual object at the defined location of the particular instance of the virtual object that corresponds to a particular grid element;

for each instance of the virtual object of the plurality of instances of the virtual object within the game environment:

identifying a particular blend map of the plurality of blend maps associated with the particular instance of the virtual object;

rendering the particular instance of the virtual object by blending the first version of the virtual object of the plurality of versions of the virtual object with the second version of the virtual object of the plurality of versions of the virtual object based at least in part on the transform values of the particular blend map resulting in a rendered instance of the virtual object; and generating instructions to output the rendered instance of the virtual object within the game environment.

17. The computer readable medium of claim 16, the operations further comprising:

receiving an indication of an action performed in the game environment affecting a first instance of the plurality of instances of the virtual object;

identifying one or more attributes associated with the action;

updating one or more transform values of a first blend map of the plurality of blend maps associated with the first instance of the virtual object, based at least in part on the identified one or more attributes associated with the action; and updating the rendered instance of the virtual object by blending between at least the first version of the virtual object and the second version of the virtual object, based at least in part on the one or more transform values of the first blend map.

* * * * *